(12) United States Patent
Maletsky et al.

(10) Patent No.: US 11,876,791 B2
(45) Date of Patent: *Jan. 16, 2024

(54) MESSAGE AUTHENTICATION WITH SECURE CODE VERIFICATION

(71) Applicant: Atmel Corporation, Chandler, AZ (US)

(72) Inventors: Kerry Maletsky, Monument, CO (US); Oscar Sanchez, Colorado Springs, CO (US); Nicolas Schieli, Los Gatos, CA (US)

(73) Assignee: Amtel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,173

(22) Filed: Mar. 30, 2020

(65) Prior Publication Data
US 2020/0236097 A1  Jul. 23, 2020

Related U.S. Application Data

(63) Continuation of application No. 15/131,919, filed on Apr. 18, 2016, now Pat. No. 10,616,197.

(51) Int. Cl.
*H04L 29/06* (2006.01)
*H04L 9/40* (2022.01)
(Continued)

(52) U.S. Cl.
CPC ............ *H04L 63/08* (2013.01); *H04L 9/3242* (2013.01); *H04L 9/3247* (2013.01); *H04L 63/12* (2013.01);
(Continued)

(58) Field of Classification Search
CPC . H04L 9/00; H04L 63/08; H04L 63/12; H04L 67/025; H04L 67/125; H04L 67/42;
(Continued)

(56) References Cited

U.S. PATENT DOCUMENTS

| | | |
|---|---|---|
| 5,422,632 A | 6/1995 | Bucholtz et al. |
| 6,212,635 B1 | 4/2001 | Reardon |
| | (Continued) | |

FOREIGN PATENT DOCUMENTS

| | | | |
|---|---|---|---|
| CN | 1516836 A | 7/2004 | |
| CN | 1270468 C | * 8/2006 | ........... G06F 21/572 |
| | (Continued) | | |

OTHER PUBLICATIONS

Boneh, D., Boyers, X., and Shacham, H., "Short Group Signatures", Advances in Cryptology, Crypto 2004, Springer-Verlag, pp. 1-19.
(Continued)

*Primary Examiner* — Joseph P Hirl
*Assistant Examiner* — Leynna Truvan
(74) *Attorney, Agent, or Firm* — TraskBritt

(57) ABSTRACT

Systems, methods, circuits and computer-readable mediums for message authentication with secure code verification are provided. In one aspect, a system includes a client device storing a code and a security device coupled to the client device. The security device is configured to receive a property of the code generated by the client device, verify correctness of the property of the code based on information associated with an authorized code to determine that the code is authorized, the information being stored within the security device. In response to determining that the code is authorized, the security device enables to access data stored within the security device and generate a property of a message based on the data.

10 Claims, 9 Drawing Sheets

(51) Int. Cl.
*H04L 67/025* (2022.01)
*H04L 67/125* (2022.01)
*H04L 9/32* (2006.01)
*H04L 67/01* (2022.01)
*H04L 67/60* (2022.01)

(52) U.S. Cl.
CPC ............ *H04L 67/01* (2022.05); *H04L 67/025* (2013.01); *H04L 67/125* (2013.01); *H04L 67/60* (2022.05)

(58) Field of Classification Search
CPC ..... H04L 67/32; H04L 9/3242; H04L 9/3247; G06F 21/00; H04W 12/00
See application file for complete search history.

(56) References Cited

U.S. PATENT DOCUMENTS

| | | | |
|---|---|---|---|
| 6,601,172 B1 | 7/2003 | Epstein | |
| 6,704,871 B1 | 3/2004 | Kaplan et al. | |
| 6,708,273 B1 | 3/2004 | Ober et al. | |
| 6,826,690 B1* | 11/2004 | Hind | G06F 21/31 |
| | | | 713/173 |
| 6,886,745 B2 | 5/2005 | Berrube et al. | |
| 6,961,858 B2 | 11/2005 | Fransdonk | |
| 6,996,710 B1 | 2/2006 | Ellison et al. | |
| 7,142,674 B2 | 11/2006 | Brickell | |
| 7,165,181 B2 | 1/2007 | Brickell | |
| 7,213,149 B2 | 5/2007 | Mache | |
| 7,369,856 B2 | 5/2008 | Ovadia | |
| 7,430,668 B1 | 9/2008 | Chen et al. | |
| 7,584,359 B2 | 9/2009 | Karaoguz et al. | |
| 7,596,812 B2 | 9/2009 | Li et al. | |
| 7,685,263 B2 | 3/2010 | Redjaian et al. | |
| 7,716,497 B1 | 5/2010 | Trimberger | |
| 7,822,204 B2 | 10/2010 | Yoshida et al. | |
| 8,165,301 B1 | 4/2012 | Bruce et al. | |
| 8,321,680 B2 | 11/2012 | Gantman et al. | |
| 8,347,374 B2 | 1/2013 | Schneider | |
| 8,555,072 B2 | 10/2013 | Camenisch et al. | |
| 9,106,479 B1 | 8/2015 | Mukerji et al. | |
| 9,118,469 B2 | 8/2015 | Malkin et al. | |
| 9,323,950 B2 | 4/2016 | Maletsky et al. | |
| 10,846,393 B2 | 11/2020 | Fu et al. | |
| 2002/0026578 A1 | 2/2002 | Hamann et al. | |
| 2002/0087873 A1* | 7/2002 | Zunke | G06F 21/123 |
| | | | 713/193 |
| 2003/0046542 A1 | 3/2003 | Chen et al. | |
| 2003/0093663 A1 | 5/2003 | Walker | |
| 2003/0138105 A1 | 7/2003 | Challener et al. | |
| 2003/0140238 A1 | 7/2003 | Turkboylari | |
| 2004/0101141 A1 | 5/2004 | Alve | |
| 2004/0216150 A1 | 10/2004 | Scheifler et al. | |
| 2005/0005097 A1 | 1/2005 | Murakawa | |
| 2005/0066354 A1 | 3/2005 | Dellow et al. | |
| 2005/0122995 A1 | 6/2005 | Meyer et al. | |
| 2006/0098824 A1 | 5/2006 | Mao | |
| 2006/0101288 A1 | 5/2006 | Smeets et al. | |
| 2006/0122937 A1 | 6/2006 | Gatto et al. | |
| 2006/0161761 A1 | 7/2006 | Schwartz et al. | |
| 2006/0218649 A1 | 9/2006 | Brickell et al. | |
| 2006/0282901 A1 | 12/2006 | Li et al. | |
| 2007/0021141 A1 | 1/2007 | Yokota et al. | |
| 2007/0119918 A1 | 5/2007 | Hogg et al. | |
| 2007/0123304 A1 | 5/2007 | Pattenden et al. | |
| 2007/0226518 A1 | 9/2007 | Yasaki et al. | |
| 2007/0237366 A1 | 10/2007 | Maletsky | |
| 2008/0263357 A1 | 10/2008 | Boyen | |
| 2008/0287757 A1 | 11/2008 | Berson et al. | |
| 2009/0031141 A1 | 1/2009 | Pearson et al. | |
| 2009/0129600 A1 | 5/2009 | Brickell et al. | |
| 2009/0133113 A1 | 5/2009 | Schneider | |
| 2009/0144541 A1 | 6/2009 | Kim et al. | |
| 2009/0153901 A1 | 6/2009 | Imamura et al. | |
| 2009/0232301 A1* | 9/2009 | Li | H04L 9/0838 |
| | | | 380/44 |
| 2009/0256717 A1 | 10/2009 | Iwai | |
| 2009/0292931 A1 | 11/2009 | Henry et al. | |
| 2010/0005318 A1 | 1/2010 | Hosain | |
| 2010/0045232 A1 | 2/2010 | Chen et al. | |
| 2010/0082984 A1 | 4/2010 | Ellison et al. | |
| 2010/0082987 A1 | 4/2010 | Thom et al. | |
| 2010/0088523 A1 | 4/2010 | Wooten | |
| 2010/0130166 A1 | 5/2010 | Tsuria et al. | |
| 2010/0158242 A1 | 6/2010 | Asher | |
| 2010/0185864 A1 | 7/2010 | Gerdes et al. | |
| 2010/0203960 A1 | 8/2010 | Wilson et al. | |
| 2011/0099362 A1 | 4/2011 | Haga et al. | |
| 2011/0219427 A1 | 9/2011 | Hito et al. | |
| 2011/0221568 A1 | 9/2011 | Giobbi | |
| 2011/0271099 A1 | 11/2011 | Preiss et al. | |
| 2012/0023568 A1 | 1/2012 | Cha et al. | |
| 2012/0198224 A1 | 8/2012 | Leclercq | |
| 2012/0255027 A1 | 10/2012 | Kanakapura et al. | |
| 2013/0046547 A1 | 2/2013 | Drucker et al. | |
| 2013/0145151 A1 | 6/2013 | Brown et al. | |
| 2013/0217332 A1* | 8/2013 | Altman | H04W 12/04 |
| | | | 455/41.2 |
| 2013/0276071 A1 | 10/2013 | Cen et al. | |
| 2013/0276074 A1 | 10/2013 | Orsini et al. | |
| 2014/0025944 A1 | 1/2014 | Maletsky et al. | |
| 2014/0047510 A1 | 2/2014 | Belton et al. | |
| 2014/0068246 A1 | 3/2014 | Hartley et al. | |
| 2014/0089670 A1 | 3/2014 | Maletsky et al. | |
| 2014/0188949 A1 | 7/2014 | Martinez et al. | |
| 2014/0281554 A1 | 9/2014 | Maletsky et al. | |
| 2015/0100789 A1 | 4/2015 | Born | |
| 2015/0339195 A1 | 11/2015 | Yang et al. | |
| 2016/0088668 A1 | 3/2016 | Kim et al. | |
| 2016/0099814 A1 | 4/2016 | Negi et al. | |
| 2016/0110467 A1 | 4/2016 | Hern | |
| 2016/0156621 A1 | 6/2016 | Thom et al. | |
| 2016/0217343 A1 | 7/2016 | Hoffman et al. | |
| 2017/0129457 A1 | 5/2017 | Lee et al. | |
| 2017/0235956 A1 | 8/2017 | Maletsky | |
| 2017/0235957 A1 | 8/2017 | Maletsky | |
| 2017/0272252 A1 | 9/2017 | Leggette et al. | |

FOREIGN PATENT DOCUMENTS

| | | | |
|---|---|---|---|
| CN | 101042720 A | 9/2007 | |
| CN | 101218588 A | 7/2008 | |
| CN | 104462965 A | 3/2015 | |
| CN | 104537302 A | 4/2015 | |
| WO | 02/21243 A2 | 3/2002 | |
| WO | WO-2006120365 A1 * | 11/2006 | ........... G06Q 20/346 |
| WO | WO-2011119169 A1 * | 9/2011 | ............. G06F 21/33 |

OTHER PUBLICATIONS

Edman, Matthew, 'Cryptographic Security in Wireless Networks Via Physical Layer Properties,' Doctoral Dissertation, Rensselaer Polytechnic Institute, May 2011, 141 pages.

How Certificates Work; Updated Mar. 28, 2003; retrieved https://technet.microsoft.com/en-us/library/Cc776447(v=WS.10).aspx on Jul. 17, 2015.

Johnson, D., Menezes, A., and Vanstone, S., "The Elliptic Curve Digital Signature Algorithm (ECDSA)", Jul. 27, 2001, Springer-Verlag 2001, pp. 36-63.

Lampson et al., "Authentication in Distributed Systems: Theory and Practice," ACM; Trans. Computer Systems 10, Nov. 4, 1992, pp. 265-310.

VIPER: Verifying the Integrity of PERipherals Firmware; Yanlin Li et al.; ACM; CCS'11, Oct. 17-21, 2011.

Chinese Office Action and Search Report from Chinese Application No. 201710248860.0, dated Jun. 7, 2021, 29 pages.

Chinese Office Action from Chinese Application No. 201710248860.0, dated Jan. 19, 2022, 20 pages.

(56) References Cited

OTHER PUBLICATIONS

Chinese Third Office Action for Chinese Application No. 2017102248860.0, dated Jul. 15, 2022, 20 pages with translation.

* cited by examiner

MESSAGE AUTHENTICATION WITH SECURE CODE VERIFICATION

CROSS-REFERENCE TO RELATED APPLICATION

This application is a continuation of and claims priority to U.S. patent application Ser. No. 15/131,919, filed Apr. 18, 2016, now U.S. Pat. No. 10,616,197, issued Apr. 7, 2020 the entire contents of which is incorporated herein by reference.

TECHNICAL FIELD

This disclosure relates generally to security technology, particularly to message authentication with secure code verification.

BACKGROUND

In an example scenario, a method is implemented for message authentication between devices. A client device generates a message authentication code (MAC) by hashing a message with a shared secret key stored in the client device and transmits the message together with the MAC to a host device. The shared secret key is also stored in the host device. The host device verifies the message by generating a MAC using the received message and the stored shared secret. If the received MAC and the generated MAC are equal, the message is authenticated. However, an attacker could fake secure boot of the client device and still utilize the message authentication method for a faked system to work properly, e.g., communicate with the host device, which could cause fraudulent operation.

SUMMARY

This specification describes systems, methods, circuits and computer-readable mediums for message authentication with secure code verification. In one aspect, a system includes a client device storing a code and a security device coupled to the client device. The security device is configured to receive a property of the code generated by the client device, verify correctness of the property of the code based on information associated with the code to determine that the code is an authorized code, the information being stored within the security device. In response to determining that the code is the authorized code, the security device enables to access data stored within the security device and generate a property of a message based on the data.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
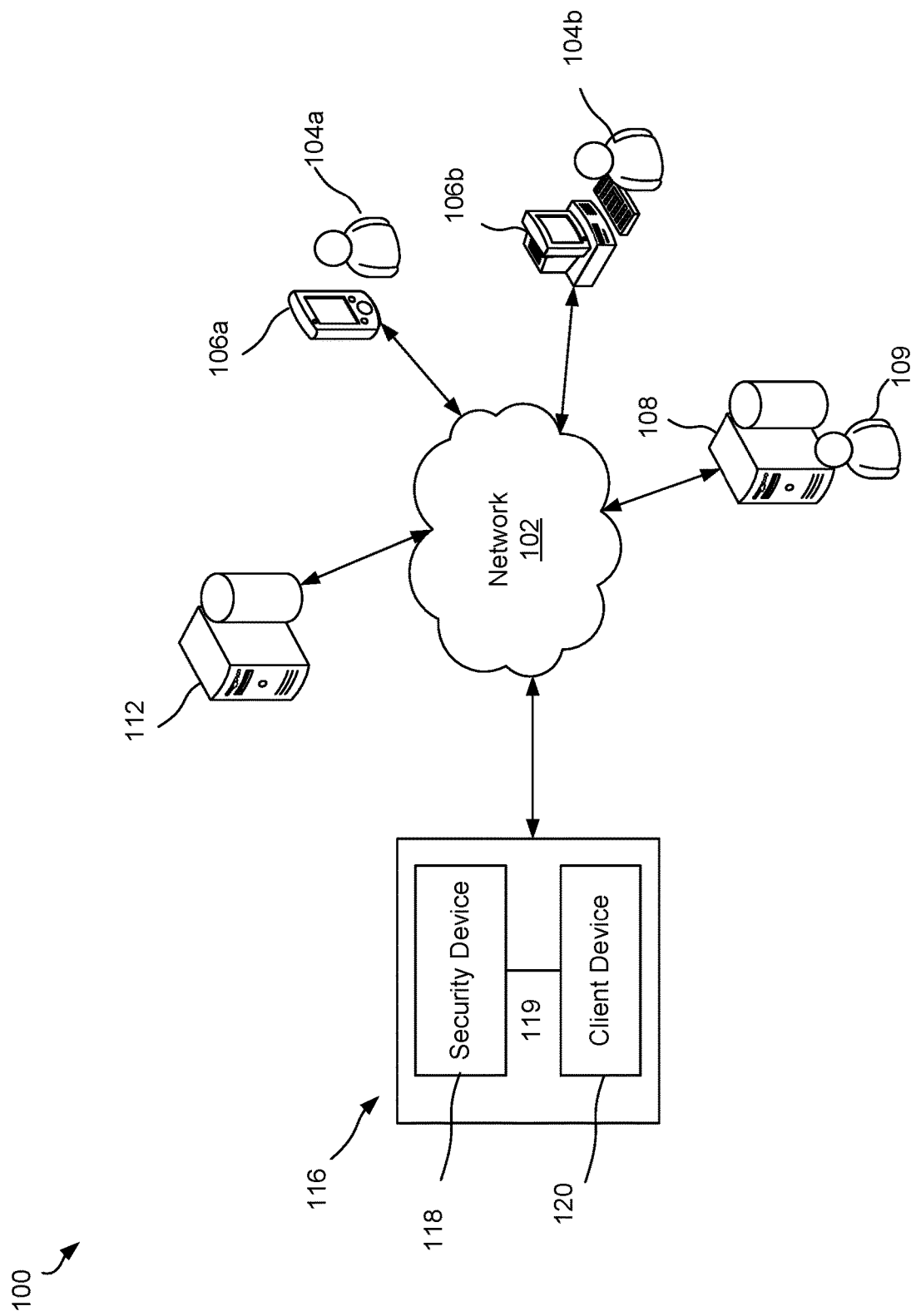
FIG. 1 is a diagram of an example environment, according to an example embodiment.

FIG. 1 is a diagram of an example environment 100, according to an implementation. For purposes of illustration, the environment 100 includes a system 116 (e.g., a client-side system) that includes a security device 118 and a client device 120. The security device 118 is configured to verify (or validate) whether code stored within the client device 120 are authorized (or authenticated). In some examples, the code includes a boot code for the client device 120 to boot (or start up), application firmware for the client device 120 to run the application, or an operation code for the client device 120 to perform a corresponding operation.

Upon the code verification, the security device 118 performs an action. In one embodiment, upon the code verification, the security device 118 enables to perform message authentication for the client device 120. The security device 118 enables to access and use secret (or private) data (e.g., information or values) stored in the security device for the message authentication. In one embodiment, upon the code verification, the security device 118 enables to change a state of a pin on the security device 118. The pin can enable (or indicate or facilitate) a component in the system 116. In one embodiment, upon the code verification, the security device 118 enables subsequent operations to run on the security device 118, which may not be enabled without the code verification. In one embodiment, upon the code verification, the security device 118 enables to access or use secret/private information on the security device 118, e.g., to read (or write) a value. In one embodiment, upon the code verification, a computation engine is enabled, e.g., by the security device 118, to become available for use. In one embodiment, upon the code verification, an I/O channel on the system 116 is activated for use, e.g., an unrelated use. In one embodiment, upon the code verification, a timer is reset to allow the system 116 to run much more time than scheduled or normal before a next check.

The security device 118 is coupled to the client device 120 through a connection 119. In some implementations, the security device 118 and the client device 120 are most closely placed, and the connection 119 is wired by a data cable (e.g., a fiber optic cable or electrically conductive cable) or wireless. In some other implementations, the security device 118 and the client device 120 are physically coupled, and the connection 119 is a hardware interface, such as a PCI interface on a motherboard. In yet other implementations, where the security device 118 and the client device 120 are integrated on a same circuit board, the connection 119 is a conductor. The security device 118 and the client device 120 can be separate chips and integrated on the same circuit board.

Furthermore, in an embodiment, as discussed in further details below, system 116 is configured to communicate with one or more remote devices or systems (host device 112, computing devices 106a, 106b, and/or server computing system 108) over a network 102. Indeed, one embodiment provides that system 116 is a client of network 102, and security device 118 and client device 120 are therefore "locally" coupled together on the client-side. Host device 112, computing devices 106a, 106b, or server computing system 108 is a host of network 102, remotely coupled to the system 116 on the host-side. The network 102 can be an external network for the system 116, e.g., a public communication network (e.g., the Internet, cellular data network, dialup modems over a telephone network), a wide area network (WAN), a local area network (LAN), a controlled area network (CAN), a private communications network (e.g., private LAN, leased lines), or any appropriate combination thereof.

In some implementations, the client device 120 communicates with the remote devices through the security device 118. The security device 118 can encrypt messages transmitted from the client device 120 with secret data (or keys) and send the encrypted messages to the remote devices. The remote devices validate the encrypted messages with corresponding secret data or keys and determine whether or not the messages from the client device 120 are authenticated based on the validation result. In some other implementations, the client device 120 communicates directly with the remote devices through the network 102. The security device 118 ensures that the client device 120 performs secure boot, applications, or operations.

In some cases, the client device 120 is unsecured or lack of security, e.g., due to constrained cost. An attacker may attack the client device 120, e.g., to modify codes stored within the client device 120 for fraudulent purposes, to fake the client device 120 to communicate with the host-side devices, to determine the method of code validation and create fraudulent code, or to publish an easy method of attacking the client device 120. In some implementations, the security device 118 is a trusted or secured device, as discussed with reference to FIG. 2. To address these security problems of the client device 120, the security device 118 is coupled to the client device 120 and configured to first verify whether codes (e.g., application firmware) stored within the client device are authorized codes. The code verification can be performed as described in U.S. patent application Ser. Nos. 15/044,693 and 15/044,770, both entitled "CONTROLLED SECURE CODE AUTHENTICATION" and filed on Feb. 16, 2016, whose contents are hereby incorporated by reference in their entirety.

If the code is determined by the security device 118 to be an unauthorized code, the security device 118 determines that the booting or application (or operation) running on the client device 120 is unsecured. The security device 118 enters into a protected mode, e.g., prohibiting or restricting the security device 118 itself from accessing critical information, e.g., secret data or cryptographic keys, stored in a secure storage. The secure storage can be included in the security device 118 or externally coupled to the security device 118. In this way, fraudulent operations can be minimized or eliminated, and the security of the client device 120 can be improved.

In some implementations, in response to determining that the code is authorized, the security device 118 enables to access the critical information such as secret data. The security device 118 can then use the secret data to protect a message associated with the client device 120. In some examples, the security device 118 receives the message from the client device that is directed to a remote device, e.g., host device 112, computing devices 106a, 106b, or server computing system 108. The security device 118 performs the message authentication with the remote device. For example, the security device 118 can generate a MAC using the message and the secret data and transmit the message with the MAC to the remote device. The remote device also includes secret data corresponding to the secret data stored in the security device 118. The remote device verifies the message by generating a MAC using the received message and the stored shared secret data. If the received MAC and the generated MAC are equal or match with each other, the remote device determines that the message is authenticated, and trusts the message from the client device. Otherwise, the remote device determines that the message is unauthenticated and does not trust the message from the client device.

In some examples, the security device 118 performs the message authentication with the client device 120, which can be used to control the client device to boot or run an application. In one embodiment, the security device 118 performs the message authentication with the client device 120 using a symmetric scheme or algorithm. The security device 118 can receive a digest of code stored in the client device 120. After verification of the code, the security device 118 uses the digest of the code (and/or a nonce) as the message, generates a MAC using the message and the secret data, and transmits the MAC to the client device 120. The client device 120 generates the MAC using the digest of the code and/or the nonce and the same secret data stored in the client device 120. If the two MACs match, the client device 120 runs an application using the code or continue to boot. Otherwise, the client device 120 restrains itself from running the application or booting. In such a way, the performance of the client device 120 is controlled by the result of the message authentication, which is further controlled by the result of the code verification. Other symmetric schemes (or algorithms) can be also used for the message authentication.

In another embodiment, the security device 118 performs the message authentication with the client device 120 using an asymmetric scheme or algorithm. For example, the client device 120 computes a signature generation and the security device 118 runs a signature verification operation. Other asymmetric (or differential) schemes (or algorithms) can be also used for the message authentication.

In one example, the security device 118 includes a secure storage. The security device 118 stores in the secure storage information associated with an authorized code for the client device 120. In some implementations, the information includes an entire image of the authorized code, a signature of the authorized code, a digest of the authorized code, a message authentication code (MAC) of the authorized code, or other properties of the authorized code. In some implementations, the information includes properties of a plurality of options of the authorized code, e.g., a digest or a signature or a MAC of each portion, or an address range for each portion. In some examples, the information does not include the entire image of the authorized code, but only the digests or signatures or MACs of the portions of the authorized code and corresponding address ranges. In some examples, the security device 118 stores cryptographic keys for verifying authenticity of code stored in the client device 120.

The security device 118 and the client device 120 can download and/or update images of respective authorized codes from a source. The source can be a secure source, (e.g., secure hardware or a secure server) or an unsecured source. The security device 118 may verify a signature or a MAC of an entire code image before doing the downloading or updating of stored information of the code image.

In some implementations, host device 112 is a controller communicating with the system 116 and one or more other sub-systems. Each sub-system includes a client device and a security device coupled to the client device. The security device is configured to perform secure code authentication and/or message authentication for the client device.

In some implementations, users 104a, 104b use computing devices 106a, 106b to communicate with the system 116 over network 102. The computing devices 106a, 106b can each be a computing device such as a mobile device, a laptop computer, a desktop computer, a smartphone, a personal digital assistant, a portable media player, a tablet computer, or any other computing device that can be used to communicate with the system 116. For illustration purpose, in FIG. 1, the computing device 106a is depicted as a mobile device, and the computing device 106b is depicted as a desktop computer. The user 104a or 104b can be an entity associated with the system 116. The user 104a or 104b can use the computing device 106a or 106b to check a status of the system 116 or remotely control an operation of the system 116 through the network 102. For example, the user 104a or 104b can use the computing device 106a or 106b to check whether code stored within the client device 120 is an authorized code for the client device 120 and communicate messages with the client device 120.

In some implementations, the server computing system 108 is in communication with the system 116 through the network 102. The server computing system 108 includes one or more computing devices and one or more machine-readable repositories, or databases. The server computing system 108 is configured to communicate with a number of systems including the system 116. For each system, the server computing system 108 can securely store respective authorized codes for respective client devices and security devices in the system. The client devices and the security devices can download the respective authorized codes from the server computing system 108 through the network 102. A user 109, e.g., an administrator or an operator, of the server computing system 108, can use the server computing system 108 to communicate with an individual system such as the system 116.

The disclosed implementations can be used in different environments. In some implementations, the environment 100 is a car environment. The system 116 can be a controller (e.g., an ECU) for a component in the car, e.g., a window controller, a brake controller, or a wheel controller. The host device 112 can be a central computing system of the car, e.g., an electronic control unit (ECU), or a gateway for directing messages from the client device to a remote computing device, e.g., server computing system 108, or computing device 106a or 106b. The user 104a or 104b can be an owner of the car and communicate with the car using a mobile phone 106a or a computer 106b through the network 102. The server computing system 108 can be a server configured to control a number of cars and associated with an entity, e.g., a car manufacturer, a car dealer, or an enterprise. It is appreciated that the disclosed implementations are not limited to the car environment and may be applicable in other contexts. For example, the system 116 can be included in an appliance, e.g., a lamp, an alarm, a garage opener, or a sensor, of a home network.

In some examples, a digest is associated with a cryptographic hash function. A device, e.g., the security device 118 or the client device 120, takes a block of data, e.g., a code or program or firmware, and uses the cryptographic hash function to compute a string, wherein the string is the (cryptographic) hash value. The data to be encoded may be referred to as the "message," and the hash value may be referred to as the "message digest," or simply as the "digest." The cryptographic hash function can include, for example, a Secure Hash Algorithm (SHA) such as SHA1, SHA2, SHA3, SHA-256, or a MD5 message-digest algorithm. The generated digest can have a fixed length or a varied length. It is noted, however, that the present technology is not limited to the implementation of such an example algorithm, and that other types of hash functions may be implemented.

In some examples, a signature is a mathematical scheme for demonstrating authenticity of a digital message, e.g., a digest of a code. The signature can be generated by a digital signature algorithm (DSA), e.g., an Elliptic Curve Digital Signature Algorithm (ECDSA). A device can use the DSA to compute or generate a signature of a digest using the digest and a key, e.g., a private key or a public key. It is noted, however, that the present technology is not limited to the implementation of such an example algorithm, and that other types of signature algorithms may be implemented.

In some examples, a message security device (MAC) is a piece of information used to authenticate a message. An algorithm accepts as input a secret key and a message to be authenticated, and outputs a MAC. The algorithm can be, for example, a keyed-hash message authentication code (HMAC) or an Advanced Encryption Standard (AES) Cipher-based Message Authentication Code (CMAC) (AES-CMAC) algorithm or many others.

In some examples, a checksum (or hash sum) is a small-size datum from a block of digital data (e.g., a code) for detecting errors which may have been introduced during its transmission or storage. The checksum can be used to verify data integrity. A checksum can be generated by a checksum algorithm or a checksum function.

In some examples, an authorized code for a device represents an original code without change or modification, e.g., as intended by an Original Equipment Manufacturer (OEM) of the device or an entity associated with the device. A code is an authorized code when unchanged or unmodified and is unauthorized code when changed or modified. An OEM signature of the authorized code is a signature generated by the manufacturer using the authorized code and an OEM private key.

In some examples, a secret key or data is information known to a specific device or system but unknown to other devices or systems. One example type of secret is I/O protection secret which is generated on one or the other device when a PC board is manufactured and written into persistent memory on both devices, e.g., a security device and a client device. The I/O protection secret may be generated by an RNG, fused set during device manufacture, or coded in a metal layer of a chip, or performed by other options. The essential properties of the I/O protection secret can include: 1) each board has a unique I/O protection secret that is shared between the client device and the security device; 2) it is difficult for any entity to determine a value of the I/O protection secret for this board, that is, for confidentiality.

Example Security and Client Devices

Figure 2:
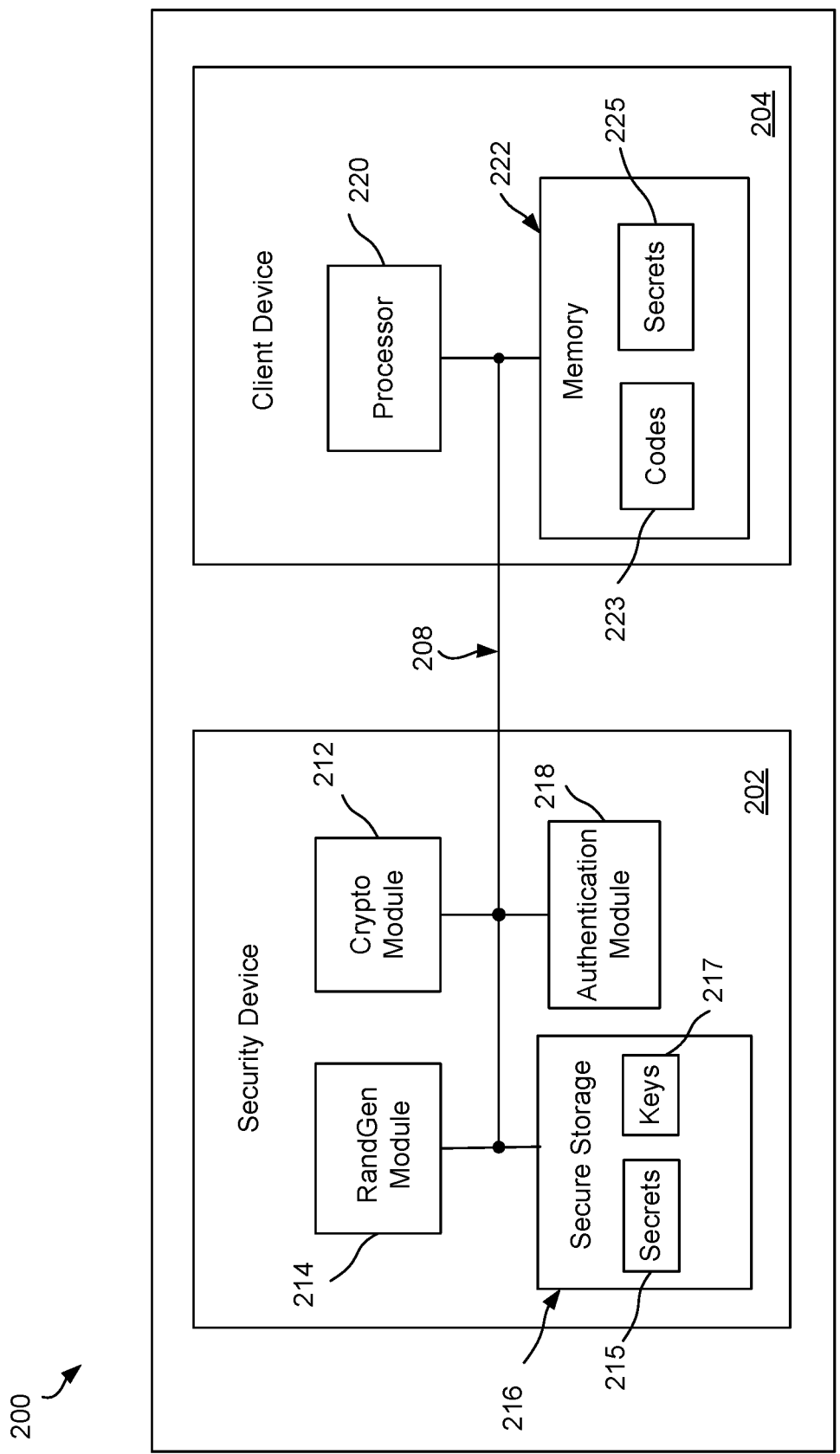
FIG. 2 is a diagram of an example system including an example security device and an example client device, according to an example embodiment.

FIG. 2 is a block diagram of an example system 200, according to an embodiment. An example security device 202 performs secure code authentication and message authentication for an example client device 204. The system 200 can be similar to the system 116 of FIG. 1. The security device 202 can be similar to the security device 118 of FIG. 1. The client device 204 can be similar to the client device 120 of FIG. 1. The security device 202 is coupled to the client device 204 using a connection 208.

The connection 208 can be similar to the connection 119 of FIG. 1. For example, connection 208 is a physical transmission bus or cable (or other communication medium) to which components of security device 202 and client device 204 are physically or communicatively coupled. In one embodiment, the security device 202 and the client device 204 are most closely placed, and the connection 208 is wired by a data cable (e.g., a fiber optic cable or electrically conductive cable) or wireless. In some other embodiment, the security device 202 and the client device 204 are physically coupled, and the connection 208 is a hardware interface, such as a PCI interface on a motherboard. In yet other embodiment, where the security device 202 and the client device 204 are integrated on a same circuit board, the connection 208 is a conductor. The security device 202 and the client device 204 can be separate chips and integrated on the same circuit board.

The client device 204 may be unsecured or lack a degree of security. For example, memory 222 in the client device 204 is unsecured, and the code and/or associated information stored in the memory 222 can be modified by an attacker. The security device 202 is configured to first verify whether code stored within the client device 204 is an authorized code. Upon verification, the security device 202 performs message authentication for the client device 204.

In some implementations, the security device 202 includes, among other components, a cryptographic (crypto) module 212, a random generation module 214, a secure storage 216, and an authentication module 218. In one embodiment, the cryptographic module 212, the random generation module 214, the secure storage 216, and the authentication module 218 are different programs, sub-routines, or portions of code that are stored within one or more storage devices within the security device 202. That is, these modules do not need to be separate physical components, instead, they can be software modules. In some implementations, the secure storage 216 is external to the security device 202 and coupled to the security device 202 through a secure or protected channel. For example, the secure storage 216 can be in a trusted third party entity. The security device 202 can retrieve information from the secure storage 216.

The cryptographic module 212 is configured to generate cryptographic properties of code or messages and perform cryptographic functions. The cryptographic module 212 can generate a digest, a signature, a message authentication code (MAC), or a checksum for the codes or messages. In some implementations, the cryptographic module 212 performs scrambling and/or unscrambling (or descrambling) functions. For example, the client device 204 scrambles code stored within the client device 204. The cryptographic module 212 can unscramble the scrambled code to get the original code.

In some implementations, the cryptographic module 212 generates challenges for the client device 204, e.g., different challenges at different times. A challenge includes a query to the client device 204 for requesting a property of a code (or a portion of such code) stored on the client device 204. The property can be a cryptographic property, e.g., a digest, a signature, a checksum, or a MAC. A challenge can also include a request for a property of a particular portion of the authorized code. In some examples, the particular portion corresponds to a memory address range (physical or virtual), e.g., an address pair including a starting address and an ending address, a middle address with a width, a starting address with a width, or an ending address with a width. The challenge can include the address range to represent the particular portion. In some implementations, a challenge includes information associated with cryptographic or authentication keys for secure authorization and/or authentication.

The random generation (RandGen) module 214 is configured to generate a random number, e.g., used as a seed for cryptographic operations performed by the security device 202. For example, the random generation module 214 includes a random number generator (RNG) that returns a certain number of random bytes (e.g., 32 random bytes) to the cryptographic module 212. In one embodiment, the random generation module 214 generates a nonce for use directly from an RNG. In one embodiment, the cryptographic module 212 combines this generated random number with a separate input number to form a cryptographic "nonce" that is stored within the security device 202 and may be used by subsequent commands. In one embodiment, a protocol nonce is a combination of a nonce from a client device and a nonce from a security device. The protocol nonce can used for cryptographic operations.

In some examples, a nonce is an arbitrary number that is used only once in a cryptographic communication between devices. The nonce may be a random or pseudo-random number issued in an authentication protocol to ensure that old communications cannot be reused in replay attacks. A nonce also may be used to ensure security for a stream cipher. To ensure that a nonce is used only once, it can be time-variant (including a suitably fine-grained timestamp in its value), or generated with enough random bits to ensure a probabilistically insignificant chance of repeating a previously generated value.

The secure storage 216 is configured to store secure information including information of an authorized code for the client device 204, secret data 215, and/or keys 217. For example, the secret data 215 includes I/O protection secret that the security device 202 can use to secure messages. The keys 217 can include a symmetric cryptographic key or an asymmetric cryptographic key for authentication or cryptographic functions. For example, the keys 217 include an OEM public key corresponding to a private key used to generate an OEM signature of an authorized code that corresponds to the code stored in the client device. The security device 202 can use the OEM public key to generate a signature of a digest of code stored within the client device 204. The secret data 215 and/or keys 217 can be stored in the security device 202 during a phase of the security device 202 such as manufacturing, factory initialization, personalization, or distribution.

In some implementations, the information of the authorized code stored in the secure storage 216 includes an entire image or copy of the authorized code, a digest of the authorized code, a signature of the authorized code, a MAC of the authorized code, or any other properties of the authorized code. The entire image of the authorized code can be stored in the secure storage 216 during a phase of production of the security device 202. The entire image of the authorized code can be also copied or downloaded from a secure source, e.g., a secure hardware or a secure server such as the server computing system 108 of FIG. 1. The security device 202 can also update the stored information of the authorized code from the secure source. In some implementations, the information of the authorized code stored in the secure storage 216 does not include the entire image or copy of the authorized code, but the digest of the authorized code, the signature of the authorized code, and/or the MAC of the authorized code.

In some implementations, the signature of the authorized code is an Original Equipment Manufacturer (OEM) signature for the client device 204, which can be stored in the security device 202 during the phase of production of the security device 202, or copied, downloaded, or updated to the security device 202 after the phase of production. In some examples, the security device 202 generates the signature of the authorized code based on the digest of the authorized code using an OEM public key 217. The security device 202 can verify authenticity of the entire image of the authorized code by comparing the generated signature with the OEM signature.

In some implementations, the information of the authorized code stored in the secure storage 216 includes information of a plurality of individual portions of the authorized code, such as a copy of an individual portion, a digest or a signature or a MAC of the individual portion, and/or an address range of the individual portion. In some examples, the secure storage 216 stores the information of the portions, without information associated with the entire image of the authorized code. In some examples, the secure storage 216 stores a signature or digest of the entire image of the authorized code, e.g., the OEM signature, in the secure storage 216, together with the information of the portions.

In some implementations, the security device 202 selects a number of memory address ranges corresponding to a number of portions of the authorized code, e.g., during downloading the entire image from a secure source. The security device 202 determines a respective portion for each memory address range. The security device 202 can then calculate a respective digest for each portion using a cryptographic hash function or algorithm, and store the digests of the portions in the secure storage 216. The security device 202 can also calculate a respective signature for each portion using the respective digest and store the signatures in the secure storage 216. In some implementations, the security device 202 stores first information indicative of the respective properties (e.g., a digest or signature) of the portions of the authorized code and second information indicative of the respective memory address ranges in the security device 202 and respectively associates memory address ranges from among the number of memory address ranges with properties from among the properties of the portions in the secure storage 216. Each time a new code verification starts, the cryptographic module 212 can randomly select an address range from the number of address ranges and generate a challenge based on the selected address range. The cryptographic module 212 can also randomly select two or more address ranges and generate a challenge based on a combination of the two or more address ranges.

The secure storage 216 can be a portion of the security device 202 that implements strong security mechanisms such that the data included in the secure storage 216 is not easily copied, cloned or modified, and any unauthorized change to the data within is detectable, e.g., by a verifying device. In one embodiment, the verifying device is remotely coupled to the security device 202. The security device can encrypt and sign collection of information stored regarding a code of the client device 204 and send encrypted blob and/or signature to the verifying device that then evaluates the encrypted blob and/or signature. In one embodiment, the security device 202 has an internal integrity check on the internal, protected nonvolatile memory, e.g., the secure storage 216. The security device 202 can verify the integrity check before performing an operation.

In some implementations, the secure storage 216 includes persistent memory such as an electronically erasable read-only memory (EEPROM) array, a flash memory, a hard drive, or any other suitable storage mechanism that is configured for storing data in a persistent manner. As indicated previously, the secure storage 216 may be used for storing information associated with the authorized code of the client device 204, secret data 215, keys 217, miscellaneous read/write, read-only or secret data, consumption logging, and security configuration. Access to the various sections of the secure storage 216 may be restricted in a variety of ways and then the configuration locked to prevent changes.

In some implementations, the secure storage 216 includes ephemeral memory used for temporary storage of data. For example, the ephemeral memory may be a static random access memory (SRAM) where downloaded or updated images of authorized codes are buffered during secure communications with a secure source or results of cryptographic or authentication operations are buffered during secure communications with the client device 204. In one embodiment, the secure storage includes an SRAM backed up with a power source, e.g., a battery or a capacitor. In some implementations, the ephemeral memory is used to store the input command or output result and intermediate computation values. The entire contents of the ephemeral memory may be invalidated whenever the secure storage 216 goes into sleep mode or the power is removed.

The authentication module 218 is configured to determine whether code stored within the client device 204 is an authorized code. The authentication module 218 is configured to communicate with and obtain information from the secure storage 216, the cryptographic module 212, and/or the random generation module 214. For example, the cryptographic module 212 sends a challenge for requesting a cryptographic property of a code of the client device 204. The client device 204 may send back a response including a cryptographic property of the code stored within the client device 204. The authentication module 218 can obtain the cryptographic property of an authorized code corresponding to the code of the client device 204, e.g., from information associated with the authorized code stored in the secure storage 216, and determine whether the cryptographic property of the code received in the response matches with the obtained cryptographic property of the authorized code. If the cryptographic property of the code matches the obtained cryptographic property of the authorized code, the authentication module 218 can determine that the code stored within the client device 204 is the authorized code. If the cryptographic property of the code does not match with the obtained cryptographic property of the authorized code, the authentication module 218 determines that the code is not the authorized code or unauthorized.

In some implementations, the client device 204 includes, among other components, a processor 220 and memory 222. The memory 222 can be an internal or external memory of the processor 220. The memory 222 is configured to store one or more codes (e.g., application firmware) 223 of the client device 204 and secrets 225. For example, the secrets 225 include a shared I/O protection secret corresponding to the I/O protection secret data 215 stored in the security device 202. The client device 204 can generate a MAC using the shared I/O protection secret. The secrets 225 can be stored in the memory 222 during a phase of production of the memory 222 or the client device 204. The secrets 225 can be read-only and hard to be modified.

A code and/or information associated with the code (e.g., an OEM signature of the code) can be stored in the memory 222 during a phase of production of the client device 204 such as manufacturing, factory initialization, personalization, or distribution. The code and/or associated information can be also copied or downloaded from a secure source such as secure hardware or a secure server. The client device 204 can also update the code and/or associated information from the secure source.

The processor 220 is configured to perform operations using code stored in the memory 222. For example, the processor 220 boots using a boot code, runs an application using application firmware, or performs an operation using an operation code. The processor 220 can perform cryptographic functions to generate cryptographic properties of the code, e.g., hash the code to generate a digest, hash a message to generate a MAC, scramble the code, or generate a signature. In some embodiments, the processor 220 includes a random generation module similar to the random generation module 214 that can generate a random number or nonce.

In some implementations, the processor 220 is configured to response to challenges or queries from the security device 202. In some cases, the client device 204 receives, from the security device 202, a request including a challenge for a cryptographic property of the code, e.g., a digest or signature or MAC of the code. The processor 220 can obtain or generate a cryptographic property of the code based on information from the memory 222 including the stored code and/or associated information and send back a response including the obtained cryptographic property of the code. In some examples, the challenge requests a cryptographic property of a particular portion of the code. For example, the challenge includes a particular address range corresponding to the particular portion. The processor 220 can identify a portion of the code corresponding to the particular address range and generate the cryptographic property of the corresponding portion of the code.

Example Flowcharts and Embodiments

Figure 3:
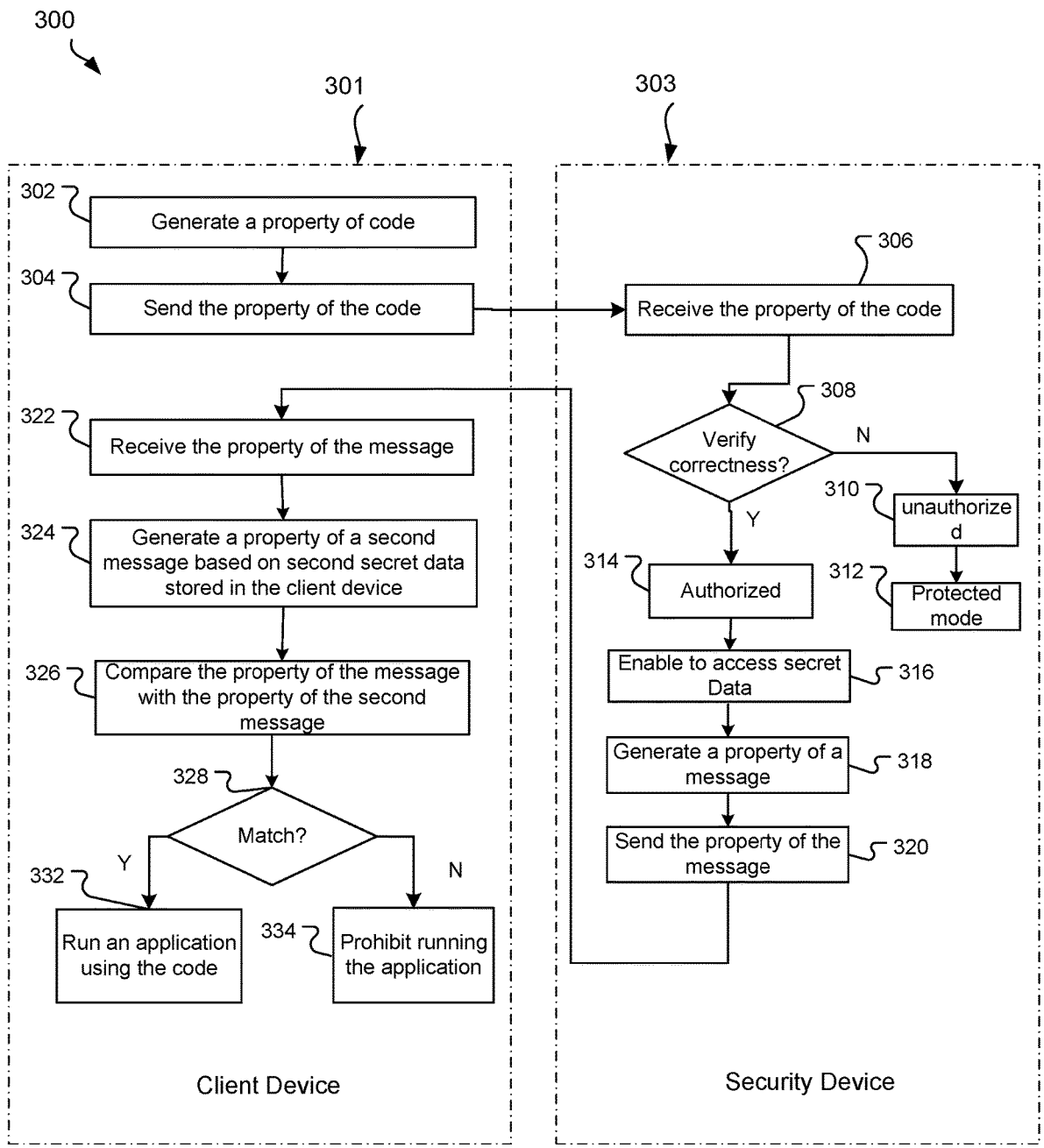
FIG. 3 is a flow diagram of an example process by which a security device performs message authentication with secure code verification for a client device, according to an example embodiment.

FIG. 3 is a flow diagram of an example process 300 by which a security device performs secure message authentication with secure code verification for a client device. For example, operations in box 301 are performed by the client device, where operations in box 303 are performed by the security device. The security device can be similar to the security device 118 of FIG. 1 or the security device 202 of FIG. 2. The client device can be similar to the client device 120 of FIG. 1, or the client device 204 of FIG. 2.

The client device generates a property of code stored within the client device (302). The code can be a boot code, application firmware, or an operation code. The property of the code can be a digest of the code or scrambled data of the code. The client device can be triggered to perform step 302, for examples, by a predetermined schedule (e.g., every 1 second) or after a period of time from previous code authentication, whenever the client device reboots, or receiving a request from the security device or a remote device, e.g., host device 112, computing devices 106a, 106b, or server computing system 108 of FIG. 1. For example, as discussed in further details with respect to FIGS. 8 and 9, the client device receives a request from the security device, the request including a memory address range corresponding to a portion of the code. The client device can determine the portion of the code based on the memory address range and generate a property of the portion of the code.

The client device sends the generated property of the code to the security device (304). In some examples, the client device sends a generated digest of the code together with a validated signature of the code, e.g., an OEM signature, to the security device.

The security device receives the property of the code from the client device (306) and verifies correctness of the property of the code (308). If the security device verifies incorrectness of the property of the code, the security device determines that the code is unauthorized or not an unauthorized code (310). In response to determining that the code is unauthorized, the security device enters a protected mode (312). For example, the security device disables or restrains itself from accessing critical information, e.g., secret data or keys, stored in a secure storage, e.g., the secure storage 216 of FIG. 2. In some cases, in response to determining that the code is unauthorized, the security device prevents the client device from communicating with a remote device via a network, e.g., the network 102 of FIG. 1.

If the security device verifies correctness of the property of the code, the security device determines that the code is authorized or an authorized code (314). In response to determining that the code is authorized, the security device enables to access critical information, e.g., secret data or keys stored in the secure storage (316).

In some examples, the property of the code is a digest of the code generated by the client device. The security device generates a signature of the code based on the received digest of the code and a public key (e.g., an OEM public key) stored within the security device (e.g., in the secure storage). The security device then determines whether the generated signature of the code matches a signature of an authorized code corresponding to the code (e.g., an OEM signature of the code). In some cases, the signature of the authorized code is stored within the security device (e.g., in the secure storage). In some cases, the client device stores the signature of the authorized code and sends it to the security device for code verification. If the generated signature of the code matches the signature of the authorized code, the security device determines that the code is the authorized code (314). Otherwise, the security device determines that the code is not the authorized code (310).

In some examples, the property of the code is the digest of the code. The security device stores a digest of the authorized code. For example, when the security device receives an entire image of the authorized code, the security device calculates a digest of the authorized code and generates a signature of the digest to verify with an OEM signature of the authorized code. If the generated signature matches the OEM signature, the security device stores the digest of the authorized code in a secure storage, e.g., without storing the entire image of the authorized code.

When performing step 308, the security device can compare the received digest of the code with the stored digest of the authorized code to determine whether they match. In some cases, the security device stores an entire image of the authorized code, and generates a digest of the authorized code to compare with the received digest of the code from the client device.

In some examples, the property of the code includes scrambled data of the code. The client device scrambles the code to generate the scrambled data. The security device unscrambles (or descrambles) the received scrambled data of the code, e.g., to get the original code stored within the client device. The security device can then generate a digest of the unscrambled data of the code. As shown above, to verify the correctness of the property of the code, the security device can generate a signature of the code based on the generated digest and a stored public key and determine whether the generated signature of the code matches the signature of the authorized code.

Successful verification of the code stored in the client device (314) enables the security device to access secret data or keys stored in the secure storage (316). In some implementations, the stored secret data or keys can only be accessed by the security device based on the successful verification of the code. The security device can then use the secret data or keys to authenticate message(s) associated with the client device.

In some implementations, the security device uses the secret data for message authentication with a remote device, e.g., host device 112, computing devices 106a, 106b, or server computing system 108 of FIG. 1, which the client device communicates with. The client device sends a message directed to the remote device. The security device receives the message from the client device and generates a property of the message based on the stored secret data or keys. For example, the security device generates a MAC of the message using the stored secret data that is shared with the remote device. The security device can append the generated MAC to the message and send the message with the appended MAC to the remote device. The remote device can use the shared secret data stored in the remote device to generate a MAC of the message and validate the received MAC from the security device with the generated MAC. If the received MAC matches the generated MAC, the remote device determines that the message from the client device is authentic or can be trusted. Otherwise, the remote device determines that the message is not authentic or cannot be trusted.

In some implementations, the security device uses the secret data for message authentication with the client device. In some examples, in response to determining that the code is authorized (314), the security device generates a value indicating successful verification of the code. The security device can also generate a nonce. The security device uses the value and/or the nonce as the message to be authenticated. In some examples, the client device generates a nonce and send the nonce to the security device. The security device uses the nonce and/or the received property of the code as the message to be authenticated.

Referring back to FIG. 3, the security device generates a property of the message (318) and sends the property of the message to the client device (320). The property of the message can be a MAC of the message based on the message and the secret data. In some examples, the security device sends the message, e.g., the indication value and/or the generated nonce, to the client device.

The client device receives the property of the message (322) and generates a property of a second message based on second secret data stored within the client device (324). The second secret data can be the same as the secret data stored within the security device, e.g., a shared I/O protection secret. The second message can include the same information as the message. In some examples, the message includes the indication value and the nonce generated by the security device, and the second message also includes the indication value and the nonce received from the security device. In some examples, the message includes the property of the code and/or a nonce generated by the client device, and the second message includes the property of the code and/or the nonce.

The client device compares the received property of the message with the generated property of the second message (326) and determines whether these two properties match with each other (328). If the client device determines that these two properties match, the client device runs an application using the code (332). For example, if the code is a boot code, the client device continues to boot. If the code is application firmware, the client device runs a corresponding application. If the code is an operation code, the client device performs a corresponding operation. Otherwise, if the client device determines that these two properties do not match, the client device prohibits itself from running the application using the code (334).

Figure 4:
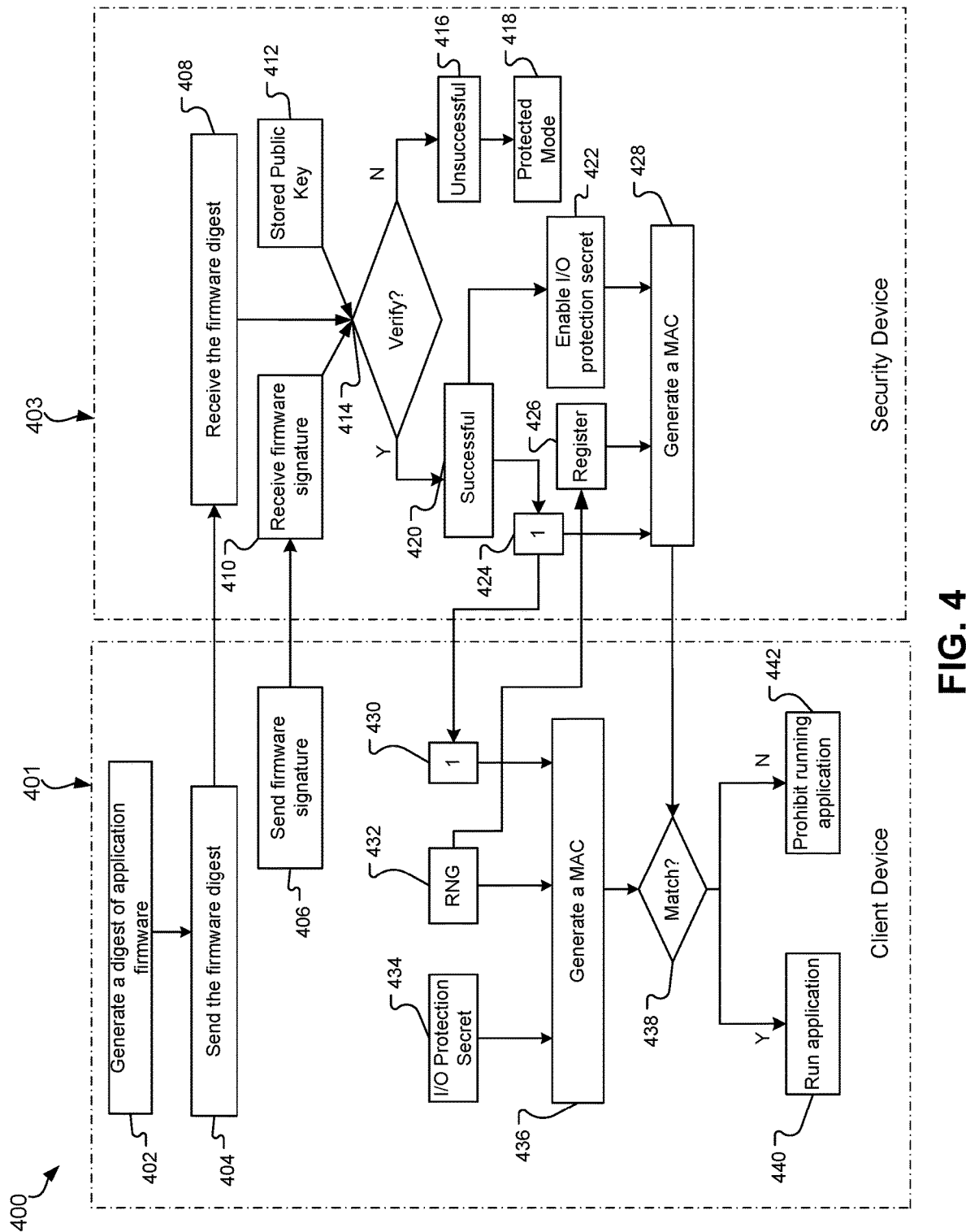
FIG. 4 is a flow diagram of an example process by which a security device performs message authentication with secure code verification for a client device, according to another example embodiment.

FIG. 4 is a flow diagram of an example process 400 by which a security device performs message authentication with secure code verification for a client device, according to another example embodiment. For example, operations in box 401 are performed by the client device, where operations in box 403 are performed by the security device. The security device can be similar to the security device 118 of FIG. 1 or the security device 202 of FIG. 2. The client device can be similar to the client device 120 of FIG. 1, or the client device 204 of FIG. 2. For illustration, the code here is application firmware stored within the client device.

The client device generates a digest of the application firmware (402) and sends the digest of the application firmware to the security device (404). The client device also sends a firmware signature (e.g., an OEM signature of the application firmware) stored within the client device to the security device (406).

The security device receives the digest of the application firmware (408) and receives the firmware signature (410). The security device then verifies correctness of the digest of the application firmware (414) using the received digest, the firmware signature, and a public key (412) stored in the security device. The public key can be an OEM public key. The security device generates a signature of the digest of the application firmware based on the public key and then compare the generated signature with the firmware signature.

If the generated signature does not match the firmware signature, the security device determines that the verification is unsuccessful (416), that is, the firmware is not authorized, the security device enters into a protection mode (418), similar to step 312 of FIG. 3. If the generated signature matches the firmware signature, the security device determines that the verification is successful (420), that is, the firmware is authorized. In response to the successful verification of the firmware, the security device enables to access I/O protection secret (422) stored in the security device, e.g., a secure storage in the security device. The security device generates a value to indicate the successful verification of the firmware (424). The value can be a number, a sequence, or a pattern. For illustration only, a Boolean "1" is used as the value in FIG. 4. The security device can also receive a nonce, e.g., a random number, from the client device and store the nonce in a register (426). The security device uses the Boolean "1" and the nonce as a message and generate a MAC of the message based on the I/O protection secret (428). The security device then sends the generated MAC to the client device.

The client device receives the value, e.g., the Boolean "1", (430) from the security device, generates the nonce using a random number generator (RNG) (432), and uses the Boolean and the nonce as a message. The client device then generates a MAC of the message (436) based on I/O protection secret (434) stored within the client device. The client device then compares the received MAC from the security device with the generated MAC to determine whether they match (438). If the generated MAC matches the received MAC, the client device proceeds to run a corresponding application using the firmware that has been verified (440). If the generated MAC does not match the received MAC, the client device is prohibited from running the application (442).

Figure 5:
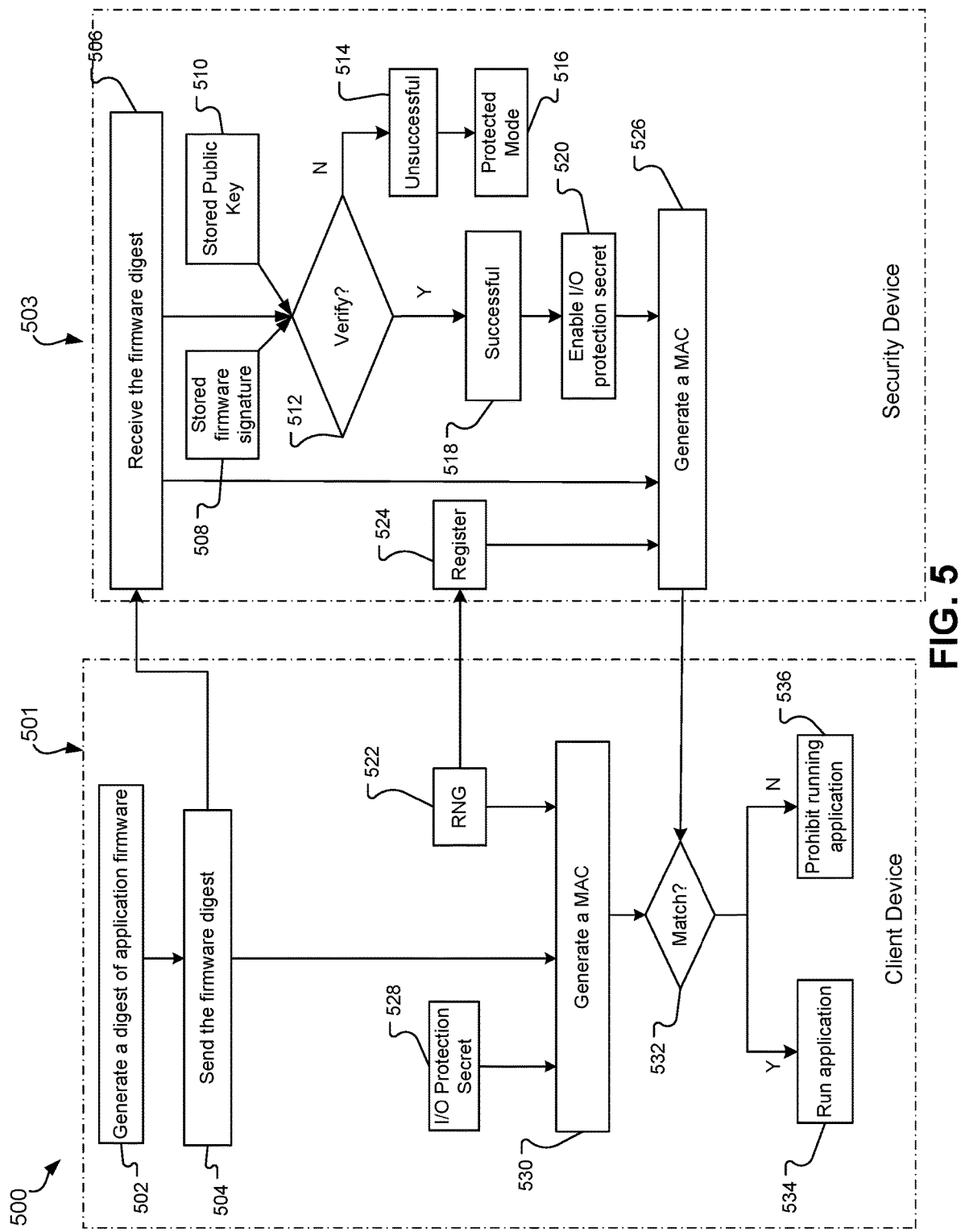
FIG. 5 is a flow diagram of an example process by which a security device performs message authentication with secure code verification for a client device, according to another example embodiment.

FIG. 5 is a flow diagram of an example process 500 by which a security device performs message authentication with secure code verification for a client device, according to another example embodiment. For example, operations in box 501 are performed by the client device, where operations in box 503 are performed by the security device. The security device can be similar to the security device 118 of FIG. 1 or the security device 202 of FIG. 2. The client device can be similar to the client device 120 of FIG. 1, or the client device 204 of FIG. 2. For illustration, the code here is application firmware stored within the client device. The client device stores application firmware and I/O protection secret in a memory of the client device. The I/O protection secret can be stored in a secured portion of the memory. The security device stores a factory public key and a firmware signature (e.g., an OEM signature of the application firmware), e.g., in a secure storage.

The client device generates a digest of the application firmware (402), e.g., by performing a cryptographic hash function. The cryptographic hash function can include, for example, a Secure Hash Algorithm (SHA) such as SHA1, SHA2, SHA3, SHA-256 or a MD5 message-digest algorithm. In a preferable embodiment, SHA 256 is used as the cryptographic hash function. It is noted, however, that the present technology is not limited to the implementation of such an example algorithm, and that other types of hash functions may be implemented.

The client device sends the generated digest of the application firmware to the security device (504). After receiving the firmware digest (506), the security device verifies authentication of the firmware (512) by using the received firmware digest, a stored firmware signature (506) and a stored public key (510). The security device generates a signature based on the received firmware digest and the stored public key and compares the generated signature with the stored firmware signature to determine whether they match. If the generated signature does not match the stored firmware signature, the security device determines the verification of the firmware is unsuccessful (514), that is, the firmware stored within the client device is not authorized, the security device enters into a protected mode (516), similar to the protected mode 312 of FIG. 3.

If the generated signature matches the stored firmware signature, the security device determines that the verification of the firmware is successful (518). In response to the successful verification of the firmware, the security device enables to access I/O protection secret stored within the security device (520). The I/O protection secret is a shared secret data with the client device which stores a corresponding I/O protection secret (528).

The client device uses an RNG to generate a nonce (522), e.g., a counter, a random number, and/or a time, and sends the nonce to the security device. The security device receives and stores the nonce in a register (524) and uses the nonce and the digest of the application firmware as a message. The security device generates a MAC of the message using the I/O protection secret (526), e.g., by an algorithm. The algorithm can be, for example, a keyed-hash message authentication code (HMAC) or an Advanced Encryption Standard (AES) Cipher-based Message Authentication Code (CMAC) (AES-CMAC) algorithm or many others. In a preferable embodiment, the security device uses encryption MAC algorithm, e.g., AES-CMAC, to generate the MAC of the message.

The client device uses the generated firmware digest (504) and the nonce (522) as a message and generates a MAC of the message (530) using the stored shared I/O protection secret (528). The client device receives the MAC generated by the security device and compares the received MAC with the generated MAC in step 530 to determine whether these two MACs match with each other (532). If these two MACs match, the client device determines that the message authentication is successful and proceeds to run an application using the stored firmware (534). Otherwise, if these two MACs do not match, the client device determines that the message authentication fails and prohibits from running the application (536).

Figure 6:
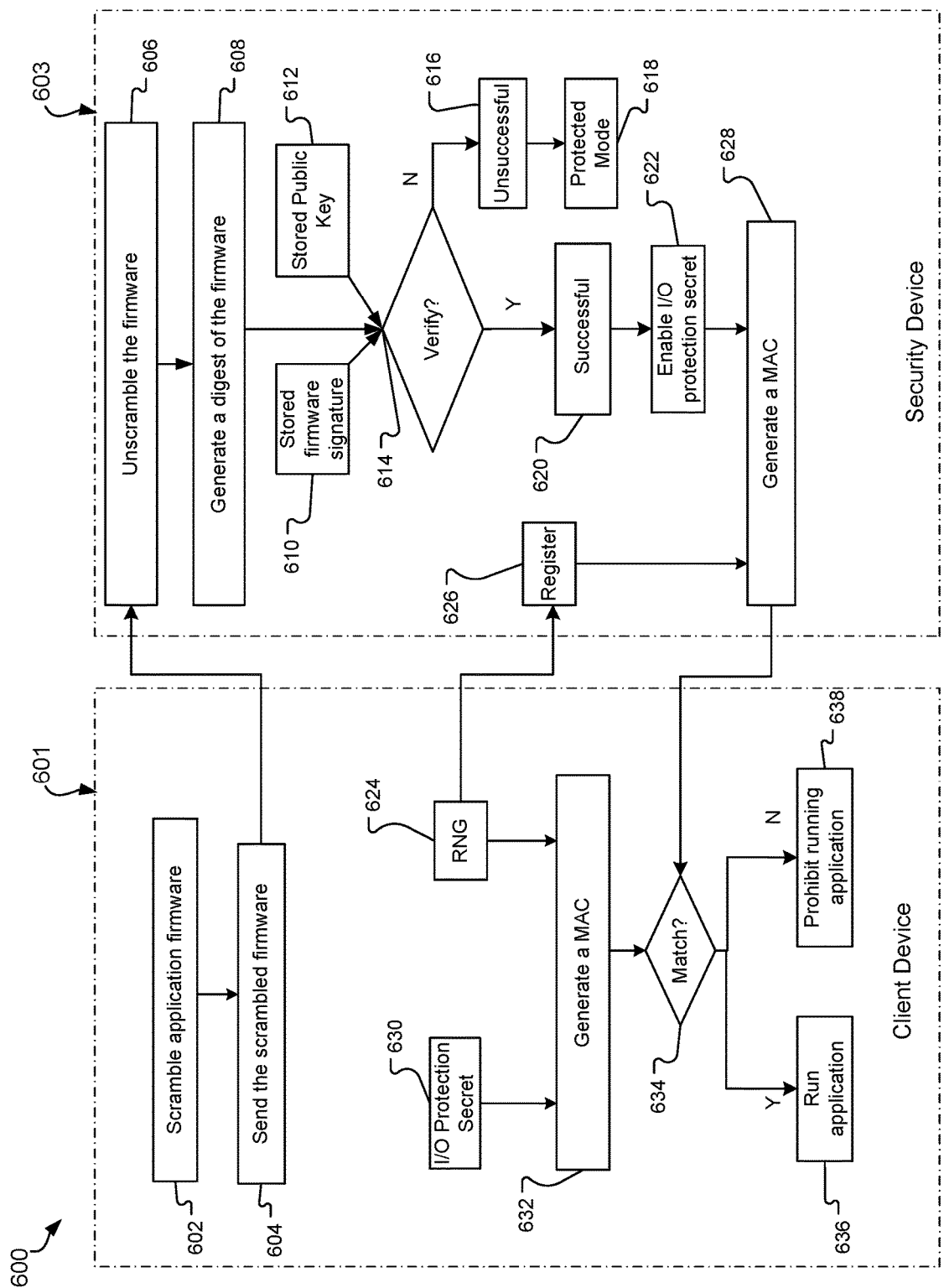
FIG. 6 is a flow diagram of an example process by which a security device performs message authentication with secure code verification for a client device, according to another example embodiment.

FIG. 6 is a flow diagram of an example process 600 by which a security device performs message authentication with secure code verification for a client device, according to a fourth example embodiment. For example, operations in box 601 are performed by the client device, where operations in box 603 are performed by the security device. The security device can be similar to the security device 118 of FIG. 1 or the security device 202 of FIG. 2. The client device can be similar to the client device 120 of FIG. 1, or the client device 204 of FIG. 2. For illustration, the code here is application firmware stored within the client device. The client device stores application firmware and I/O protection secret in a memory of the client device. The I/O protection secret can be stored in a secured portion of the memory. The security device stores a factory public key and a firmware signature (e.g., an OEM signature of the application firmware), e.g., in a secure storage.

The client device scrambles the application firmware stored within the client device (602). The client device can use a scrambling function, e.g., AES, TEA (Tiny Encryption Algorithm), XTEA (eXtended TEA), SEAL (Software-Optimized Encryption Algorithm), WAKE, or many others. The client device sends the scrambled firmware to the security device (604). The security device unscrambles the received scrambled firmware to get the original firmware stored within the client device (606). Then the security device generates a digest of the unscrambled firmware (608). The security device can include a hardware hash engine, e.g., the cryptographic module 212 of FIG. 2, which can generate the hash with fast speed. The scrambling function the client device uses and an unscrambling function the security device uses can enable fast speed and/or high security.

The security device verifies authentication of the firmware (614) by using the generated digest, the stored firmware signature (610), and the stored public key (612). The security device generates a signature of the digest using the stored public key and compares the generated signature with the stored firmware signature. If the generated signature does not match the stored firmware signature, the security device determines that the verification is unsuccessful (616) and enters into a protection mode (618). If the generated signature matches the stored firmware signature, the security device determines that the verification is successful (620) and enables to access stored I/O protection secret (622).

The client device uses an RNG to generate a nonce (624) and sends the nonce to the security device. The security device receives and stores the nonce in a register (626) and uses the nonce as a message. The security device then generates a MAC of the message (628) using the I/O protection secret and sends the generated MAC to the client device. The security device can generate the MAC in parallel with I/O activity.

The client device also uses the generated nonce (624) as a message and generates a MAC of the message (632) using I/O protection secret stored in the client device, which can be the same as the I/O protection secret stored within the security device. The client device compares the generated MAC with the received MAC from the security device and determines whether these two MACs match (634). If these two MACs match, the client device determines that the message authentication is successful and proceeds to run an application using the stored firmware (636). Otherwise, if these two MACs do not match, the client device determines that the message authentication fails and prohibits running the application (638).

Figure 7A:
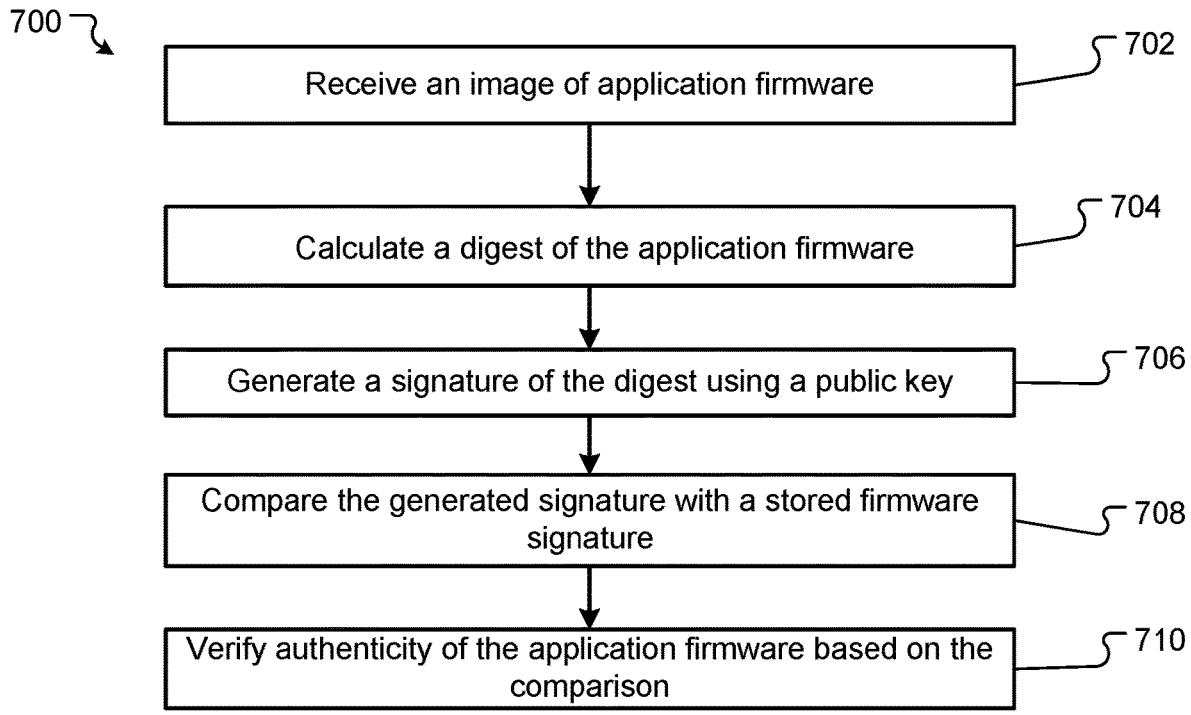
FIG. 7A is a flow diagram of an example process by which a security device verifies authenticity of firmware, according to an example embodiment.
Figure 7B:
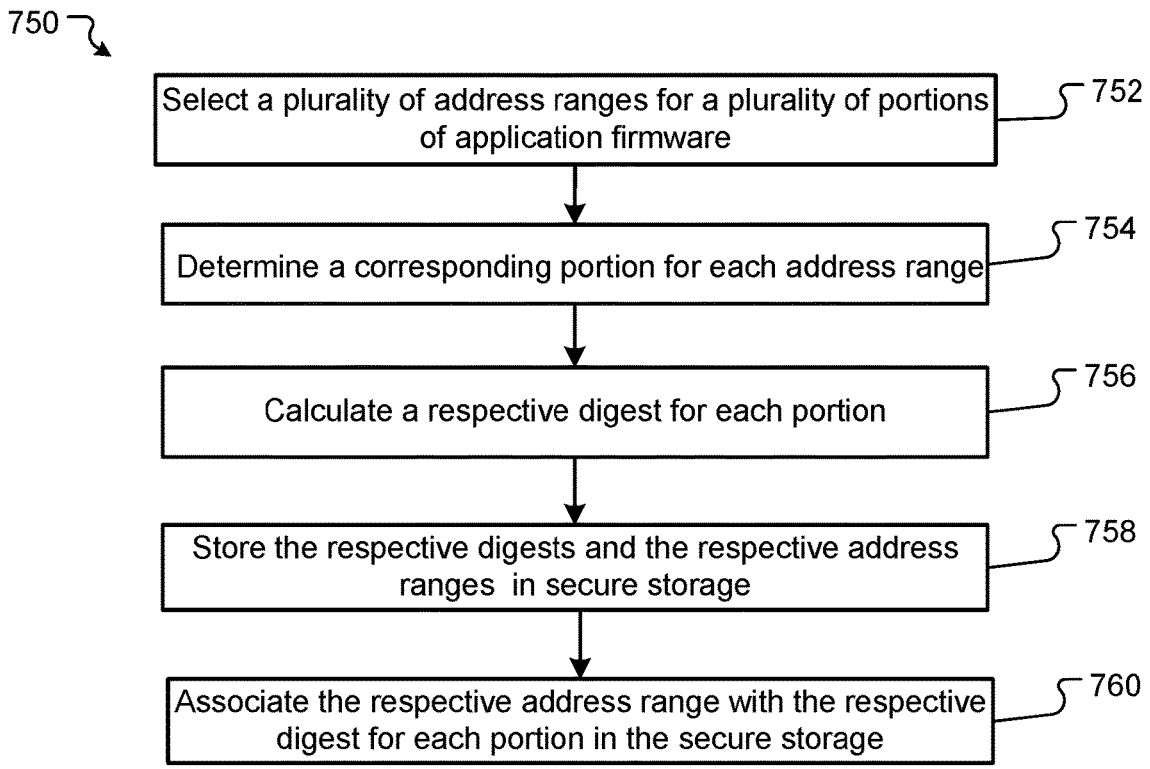
FIG. 7B is a flow diagram of another example process by which a security device stores information of portions of firmware, according to an example embodiment.
Figure 8:
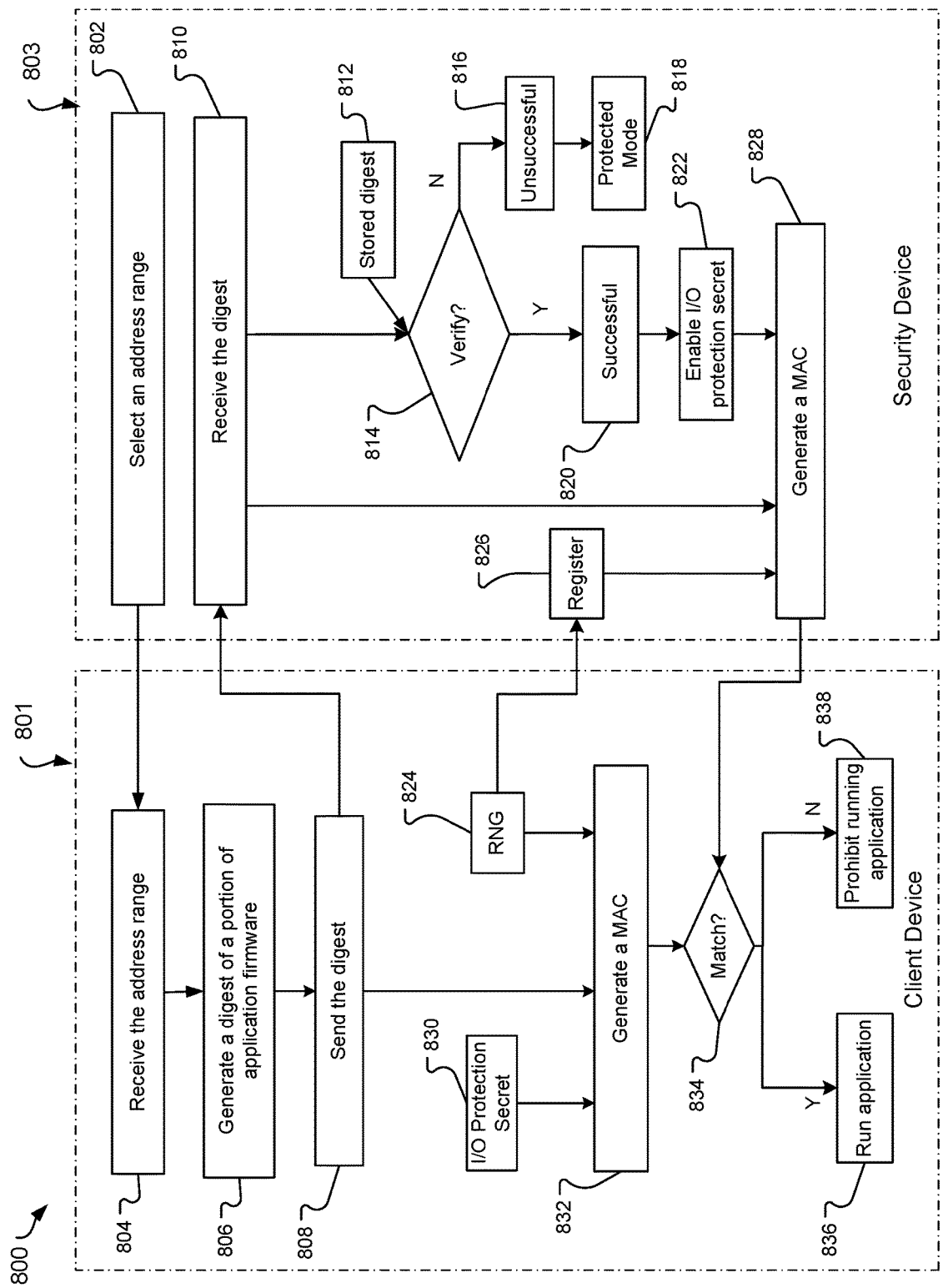
FIG. 8 is a flow diagram of an example process by which a security device performs message authentication with secure partial verification for code stored within a client device, according to an example embodiment.
Figure 9:
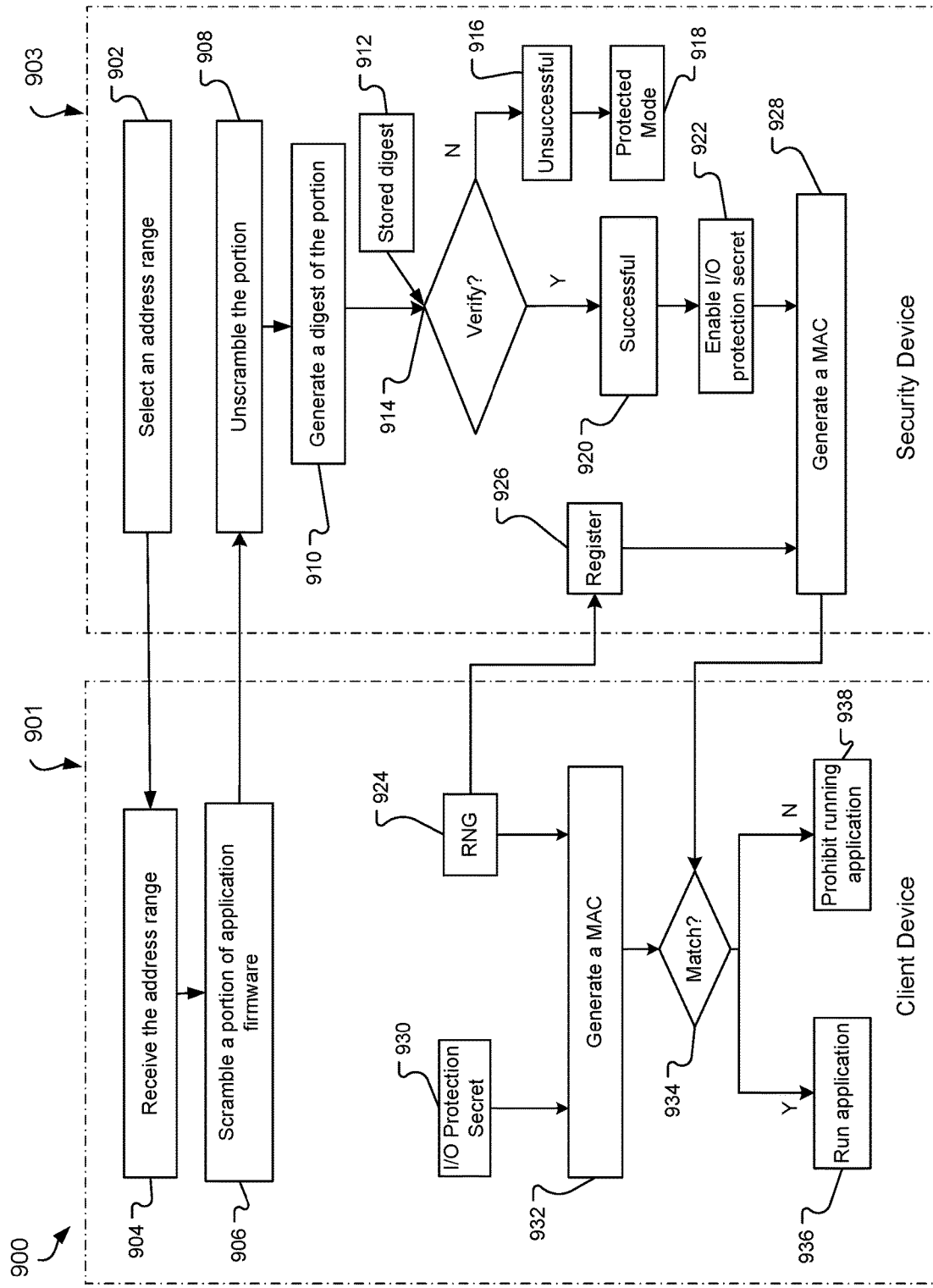
FIG. 9 is a flow diagram of an example process by which a security device performs message authentication with secure partial verification for code stored within a client device, according to another example embodiment.

To increase security and/or improve speed, a security device can perform partial verification of code stored in a client device, e.g., verification of a portion of the code. FIG. 7A is a flow diagram of an example process 700 by which a security device verifies authenticity of application firmware of a client device, according to an example embodiment. FIG. 7B is a flow diagram of another example process 750 by which the security device stores information of portions of the firmware for the client device, according to an example embodiment. FIGS. 8 and 9 show example processes by which the security device performs message authentication with secure partial verification of the firmware for the client device.

The security device can be similar to the security device 118 of FIG. 1 or the security device 202 of FIG. 2. The client device can be similar to the client device 120 of FIG. 1, or the client device 204 of FIG. 2. For illustration, the code here is application firmware stored within the client device. The client device stores application firmware and I/O protection secret in a memory of the client device. The I/O protection secret can be stored in a secured portion of the memory. The security device stores a factory public key (e.g., an OEM public key) and an authenticated firmware signature (e.g., an OEM signature), e.g., in a secure storage.

Referring to FIG. 7A, the security device receives an image of application firmware (702), e.g., from a source. The source can be the original manufacturer or a trusted or secure source such as host device 112, computing devices 106a, 106b, or server computing system 108 of FIG. 1. The security device can update information associated with the application firmware by downloading a new image of application firmware from the source.

The security device calculates a digest of the application firmware (704), and then generates a signature of the digest of the application firmware using a public key (706), e.g., an OEM public key that is stored within the security device. The security device compares the generated signature with the stored firmware signature (708) and verifies authenticity of the application firmware based on the comparison (710). If the generated signature does not match the stored firmware signature, the security device determines that the received image of application firmware is not authorized or not authentic. The security device can discard the received image. If the generated signature matches the stored firmware signature, the security device determines that the received image of application firmware is authorized or authentic. The security device can store a digest of the new image of application firmware in the secure storage, or proceed to process 750, e.g., without storing the entire image of application firmware.

Referring to FIG. 7B, process 750 can be executed after verifying authenticity of the received image of application firmware. The security device selects a plurality of address ranges for a plurality of portions of application firmware (752). The security device can randomly select the plurality of address ranges from a range defined by a starting address and an ending address of the application firmware. The selected address ranges can be different from each other and can have same or different sizes. The selected address ranges can include address ranges corresponding to critical portions of application firmware. The security device can check the critical portions more frequently than other non-critical portions. Each time, when the security device updates a new image of application firmware, the security device can select a different plurality of address ranges from a previous plurality of address ranges.

The security device determines a corresponding portion for each address range (754), and calculates a respective digest for each portion (756). The security device stores first information indicative of the respective properties of the portions of the application firmware and second information indicative of the respective memory address ranges in the secure storage (758), and respectively associates memory address ranges from among the plurality of memory address ranges with properties from among the properties of the portions in the secure storage (760). Note that the security device can only store the digests with associated memory address ranges, without storing the image of application firmware or portions of the application firmware.

Referring to FIG. 8, process 800 shows that the security device performs message authentication with secure partial verification of the firmware for the client device. For example, operations in box 801 are performed by the client device, where operations in box 803 are performed by the security device. The security device selects an address range (802) from the memory address ranges stored in the secure storage. The security device can randomly select the address range from the number of memory address ranges. The security device can also select the address range to be one corresponding to a critical portion of the application firmware. The security device can also select the address range based on sizes of corresponding portions of the memory address ranges. For example, to meet particular boot time restriction, the security device can select an address range corresponding to a portion with a smaller size or a larger size.

In some implementations, the client device is required to execute a new validation on a predetermined time schedule, e.g., every 1 second, or whenever the client device reboots. The security device can select a different memory range corresponding to a different portion of the application firmware each time, such that a number of portions of application firmware stored within the client device can be verified over time. The security device can also vary statistics of the selection of different portions to make logging the stored memory ranges difficult.

In some implementations, a system includes a number of sub-systems each including a respective client device and a respective security device. The sub-systems can be identical to each other. The client devices perform a same operation, e.g., a booting operation, using a same code. Each of the security devices can select a set of portions of the code and use the set of portions for secure code authentication with the corresponding client device. Different security devices can select different sets of portions of the code, and/or have different sets of address ranges for the client devices. In some cases, a security device updates a new image of the code and selects a new set of portions of the code. The new set of portions of the code can be different from a previous set of portions selected by the same security device.

In some implementations, the subsystems are different from each other. The client device in each subsystem can perform a corresponding operation using a corresponding code. Each security device can select a set of portions of the corresponding code and use the set of portions for secure code authentication with the corresponding client device. The codes for different client devices can be different from each other. Different security devices can select different sets of portions of the different codes for secure code authentication with the client devices.

Referring back to FIG. 8, the client device receives the selected address range from the security device (804). The client device determines a corresponding portion of application firmware stored within the client device based on the address range. The client device then generates a digest of the portion of the application firmware (806).

The client device sends the generated digest of the portion of the application firmware to the security device (808). The security device receives the digest from the client device (810) and verifies the received digest with a stored digest (812) associated with the selected address range in the secure storage (814). If the received digest does not match the stored digest, the security device determines that the verification is unsuccessful (816), that is, the portion of the application firmware stored within the client device is not authorized. The security device can determine that the firmware stored within the client device is not authorized or not trusted. In response to determining that the verification is unsuccessful, the security device enters a protection mode (818), similar to the protection mode (312) of FIG. 3.

If the received digest matches the stored digest, the security device determines that the verification is successful (820), that is, the portion of the application firmware stored within the client device is authorized. The security device can determine that the firmware stored within the client device is also authorized. In some cases, the security device can select one or more different address ranges for sequent verifications with the client device. If all the verifications are successful, the security device determines that the firmware stored within the client device is authorized.

In response to determining that the verification is successful, the security device enables to access I/O protection secret stored in the secure storage that is shared with the client device (822). In some implementations, the client device uses an RNG to generate a nonce (824) and sends the nonce to the security device. The security device receives and stores the nonce in a register (826) and uses the received nonce and the received digest of the portion of the application firmware as a message. The security device generates a MAC of the message using the stored I/O protection secret (828), and sends the generated MAC to the client device.

The client device stores the shared I/O protection secret (830). The client device uses the generated digest of the portion of the application firmware and the generated nonce as a message, and generates a MAC of the message based on the shared I/O protection secret (832). The client device determines whether the generated MAC matches the received MAC from the security device (834). If these two MACs match, the client device proceeds to run a corresponding application using the stored application firmware, e.g., continue to boot (836). Otherwise, if these two MACs do not match, the client device prohibits itself from running the application (838).

Referring to FIG. 9, process 900 shows another implementation where the security device performs message authentication with secure partial verification of the firmware for the client device. For example, operations in box 901 are performed by the client device, where operations in box 903 are performed by the security device.

The security device selects an address range from a plurality of memory address ranges stored in the secure storage (902). The selected address range corresponds to a portion of application firmware and is associated with a digest of the portion of application firmware (912) stored in the secure storage of the security device. Step 902 can be similar to step 802 of FIG. 8.

The client device receives the selected address range from the security device (904). Based on the address range, the client device determines a portion of application firmware stored within the client device. The client device then scrambles the determined portion of the application firmware (906) and sends the scrambled portion of the application firmware to the security device.

The security device unscrambles the received scrambled portion (908) to get the original portion of the application firmware. The security device then generates a digest of the portion of the application firmware (910) and verify correctness of the portion of the application firmware (914) by comparing the generated digest with the stored digest (912) associated with the address range in the secure storage. If the generated digest does not match the stored digest, the security device determines that the verification is unsuccessful (916) and enters a protection mode (918). If the generated digest matches the stored digest, the security device determines that the verification is successful (920). Based on the successful verification of the portion of the application firmware, the security device may further determine that the firmware stored within the client device is authorized (or trusted).

In response to the successful verification of the portion of the firmware, the security device enables to access I/O protection secret stored in the secure storage (922). The I/O protection secret is shared with the client device. The client device uses an RNG to generate a nonce (924) and sends the nonce to the security device. The security device receives and stores the nonce in a register (926) and uses the nonce as a message. The security device generates a MAC of the message using the stored I/O protection secret (928), and sends the generated MAC to the client device.

The client device stores the shared I/O protection secret (930). The client device uses the generated nonce as a message, and generates a MAC of the message based on the shared I/O protection secret (932). The client device determines whether the generated MAC matches the received MAC from the security device (934). If these two MACs match, the client device proceeds to run a corresponding application using the stored application firmware, e.g., continue to boot (936). Otherwise, if these two MACs do not match, the client device prohibits itself from running the application (938).

Particular embodiments of the subject matter described in this specification can be implemented so as to realize one or more of the following advantages. This technology provides a solution for connecting secure code authentication, e.g., secure boot, with message protection. It allows the use of secret data to be part of a verification MAC only if the secure boot has been verified. If the secure boot has not been verified, it disables the use of the secret as part of the verification MAC, which can make hardware man-in-the-middle attack difficult. This technology enables the use of microcontrollers with low performance and secure capability as part of controlled area network (CAN), e.g., in automotive or other industry fields for security applications. For example, a client processor may not have necessary computation ability or memory capacity to perform a secure boot operation, and this can be off-loaded to a security device. This technology can be used for hierarchical secure boot, which can be used for larger rich OS-based systems. For example, pre-boot ROM uses a security device to verify authenticity of boot code stored within a client device, e.g., the security device can use partial verification of the boot code. The boot code can contain software, e.g., a loader, to verify a next level of code. The loader can verify code prior to loading into memory, which can be important to validate any trusted code. The technology can be applied in infotainment, telematics, and/or other systems running Linux, Android, UNIX, etc.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

The invention claimed is:

1. A system comprising:
a client device storing a code; and
a security device coupled to the client device and to:
select a plurality of memory address ranges of an authorized code;

determine a respective portion of the authorized code for each of the plurality of memory address ranges;

calculate a respective first property of each determined portion of the authorized code;

store first information indicative of the respective first properties of the portions of the authorized code and second information indicative of the respective memory address ranges in the security device; and respectively associate memory address ranges from among the plurality of memory address ranges with first properties from among the first properties of the portions;

receive a first property of a code generated by the client device;

verify correctness of the first property of the code based on information associated with the authorized code to determine that the code is authorized, the information being stored within the security device;

in response to determining that the code is authorized, enable the security device to access first secret data stored within secure storage of the security device; and generate a second property of a first message based on the first secret data, wherein the client device is to:

receive the second property of the first message from the security device;

generate the second property of a second message based on second secret data stored within the client device, the second secret data corresponding to the first secret data stored within the security device;

determine whether the second property of the second message is valid based on a comparison of the second property of the second message and the second property of the first message; and determine whether or not to run an application on the client device using the code based on a result of determining whether the second property of the second message is valid.

2. The system of claim 1, wherein the security device is to:

select a particular memory address range from among the plurality of memory address ranges; and cause data indicating the particular memory address range to be sent to the client device, the particular memory address range corresponding to a particular portion of the authorized code.

3. The system of claim 2, wherein the first property of the code comprises a digest of a portion of the code, and wherein the security device is to verify the correctness of the first property of the code by determining that the digest of the portion of the code matches a digest of the particular portion of the authorized code stored in the security device.

4. The system of claim 2, wherein the first property of the code comprises scrambled data of a portion of the code, wherein the security device is to:

descramble the scrambled data of the portion of the code to get a descrambled portion of the code, generate a digest of the descrambled portion of the code, and determine that the generated digest of the descrambled portion of the code matches the stored digest of the particular portion of the authorized code to verify the correctness of the first property of the code.

5. A method comprising:

providing a client device storing a code and a security device coupled to the client device;

selecting, by the security device, a plurality of memory address ranges of an authorized code;

determining, by the security device, a respective portion of the authorized code for each of the plurality of memory address ranges;

calculating, by the security device, a respective first property of each determined portion of the authorized code;

storing, by the security device, first information indicative of the respective first properties of the portions of the authorized code and second information indicative of the respective memory address ranges in the security device; and respectively associating, by the security device, memory address ranges from among the plurality of memory address ranges with first properties from among the first properties of the portions;

receiving, by the security device, a first property of a code generated by the client device;

verifying, by the security device, correctness of the first property of the code based on information associated with the authorized code to determine that the code is authorized, the information being stored within the security device;

in response to determining that the code is authorized, enabling the security device to access first secret data stored within secure storage of the security device;

generating, by the security device, a second property of a first message based on the first secret data;

receiving, by the client device, the second property of the first message from the security device;

generating, by the client device, the second property of a second message based on second secret data stored within the client device, the second secret data corresponding to the first secret data stored within the security device;

determining, by the client device, whether the second property of the second message is valid based on a comparison of the second property of the second message and the second property of the first message; and determining, by the client device, whether or not to run an application on the client device using the code based on a result of determining whether the second property of the second message is valid.

6. The method of claim 5, comprising:

selecting, by the security device, a particular memory address range from among the plurality of memory address ranges; and causing, by the security device, data indicating the particular memory address range to be sent to the client device, the particular memory address range corresponding to a particular portion of the authorized code.

7. The method of claim 6, wherein the first property of the code comprises a digest of a portion of the code.

8. The method of claim 7, wherein verifying the correctness of the first property of the code comprises:

determining, by the security device, that the digest of the portion of the code matches a digest of the particular portion of the authorized code stored in the security device.

9. The method of claim 6, wherein the first property of the code comprises scrambled data of a portion of the code.

10. The method of claim 9, comprising:

descrambling, by the security device, the scrambled data of the portion of the code to get a descrambled portion of the code, generating, by the security device, a digest of the descrambled portion of the code, and determining, by the security device, that the generated digest of the descrambled portion of the code matches the stored digest of the particular portion of the authorized code to verify the correctness of the first property of the code.

\* \* \* \* \*

UNITED STATES PATENT AND TRADEMARK OFFICE
CERTIFICATE OF CORRECTION

PATENT NO. : 11,876,791 B2
APPLICATION NO. : 16/835173
DATED : January 16, 2024
INVENTOR(S) : Kerry Maletsky, Oscar Sanchez and Nicolas Schieli It is certified that error appears in the above-identified patent and that said Letters Patent is hereby corrected as shown below:

In the Specification

| | | |
|---|---|---|
| Column 1, | Line 9, | change "issued Apr. 7, 2020 the" to --issued Apr. 7, 2020, the-- |
| Column 22, | Line 62, | change "The invention claimed is:" to --What is claimed is:-- |

Signed and Sealed this
Seventh Day of May, 2024

Katherine Kelly Vidal
*Director of the United States Patent and Trademark Office*